United States Patent [19]
Biagi et al.

[11] 3,755,735
[45] Aug. 28, 1973

[54] TEMPERATURE AND LOAD COMPENSATED R.F. DETECTOR FOR PEAK POWER MEASUREMENT SYSTEM

[75] Inventors: Alvaro D. Biagi, Huntington Station; Douglas McGarrett, Centereach, both of N.Y.

[73] Assignee: Republic Electronics Industries Corp., Huntington Station, N.Y.

[22] Filed: Jan. 26, 1972

[21] Appl. No.: 220,993

[52] U.S. Cl. .............................. 324/95, 324/103 P
[51] Int. Cl. ...................... G01r 21/04, G01r 19/16
[58] Field of Search ................ 324/95, 103 P, 98, 324/72.5; 329/161

[56] References Cited
UNITED STATES PATENTS
2,522,563  9/1950  Blitz ..................................... 324/95
2,862,200  11/1958  Shepherd et al. ..................... 324/95
2,602,827  7/1952  Miller ................................... 324/95

OTHER PUBLICATIONS
Proc. of the I.R.E. and Waves and Electrons, Vol. 35, No. 2, February 1947, pg. 208–211

*Primary Examiner*—Rudolph V. Rolinec
*Assistant Examiner*—Ernest F. Karlsen
*Attorney*—Edward H. Loveman

[57] ABSTRACT

A detector circuit for a radio frequency peak power measurement system includes a shielded transmission line and two identical diodes spaced a quarter wavelength apart and connected across the line. A variable power supply in a slideback arrangement provides a bias to the diodes which are thereby always maintained in a cutoff condition.

6 Claims, 1 Drawing Figure

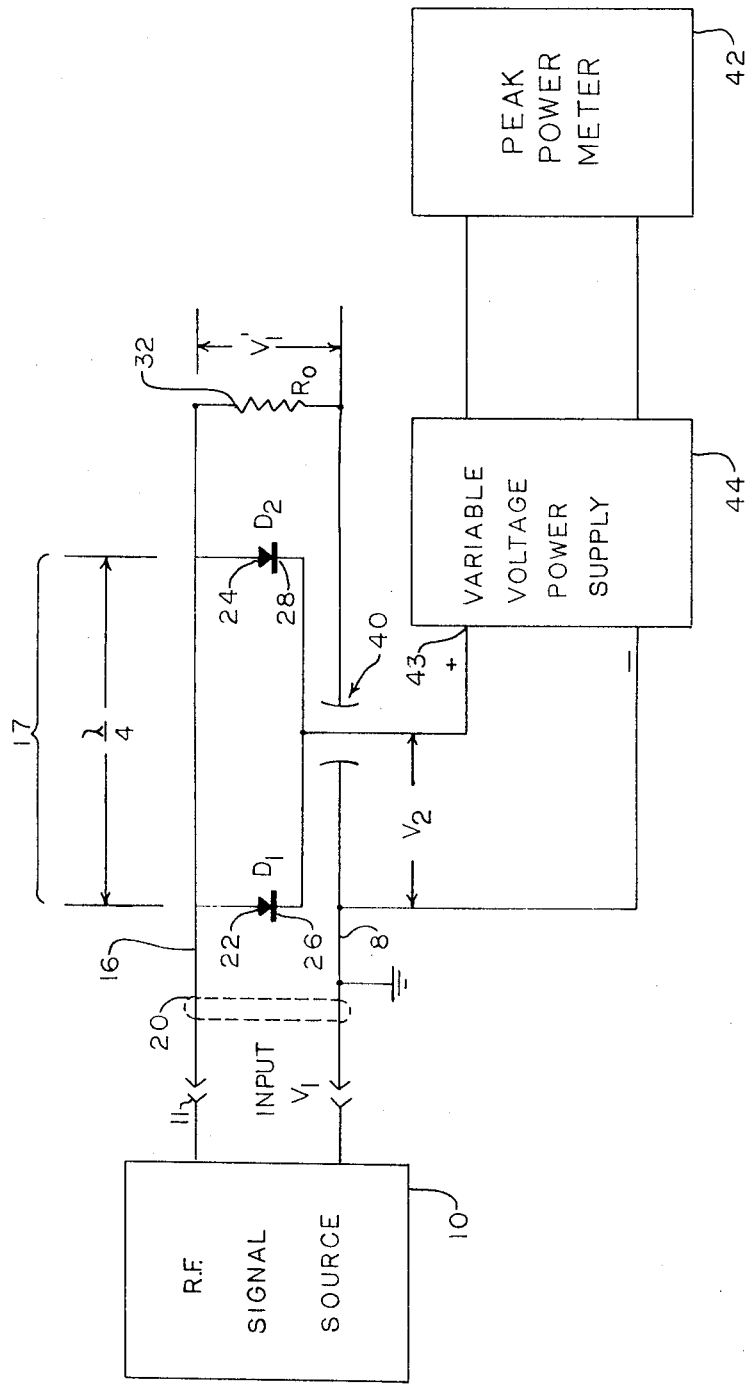

TEMPERATURE AND LOAD COMPENSATED R.F. DETECTOR FOR PEAK POWER MEASUREMENT SYSTEM

This invention concerns a radio frequency peak power measurement system employing a diode detector arrangement which provides inherent compensation of the diode device due to load and temperature changes.

The use of semiconductors as diode detectors in radio frequency power measurements has been known heretofore. However, measurements are not reliable because semiconductor diodes do not have constant impedances as a function of power level of operation. Consequently the circuits in which the diodes are used are not matched over all operating levels and thus relatively large errors result in making power measurements.

The present invention provides an arrangement for a semiconductor diode detector circuit for a radio frequency power power measurement system, in which circuit the effects of load variability of the diodes is eliminated. The diode detector circuit is used in a "slideback" function to measure the peak value of an R. F. voltage across a known load, thereby providing the data required for determining the peak power. Accuracy of measurement is assured by compensating for variability of the diode impedance under varying operating power levels and environmental conditions. This is accomplished by employing two substantially identical diodes spaced one quarter wavelength apart along a transmission line. The reactance introduced in the circuit by one diode is cancelled by the reactance of the other diode since they are spaced one quarter wavelength apart. When a diode is biased to cutoff it introduces a capacitance or capacitive reactance across a load matched to the transmission line and the magnitude of this capacitance if the diode is a semiconductor device varies with the bias voltage and circuit temperature. However, the effects of this variable capacitance area eliminated because the two diodes spaced one-quarter wavelength apart on the transmission line introduce reactance effects which are oppositely phased so that they cancel each other.

It is therefore a principal object of the invention to provide a diode detector circuit for radio frequency peak power measurement in which effects due to variations in operating level and diode circuit reactance are compensated for and cancelled at all working circuit temperatures.

Another object of the present invention is to provide a diode detector circuit for R. F. peak power measurement in which two semiconductor diodes are employed at opposite ends of a quarter wavelength transmission line located close to the source of power to be measured.

It is a further object of the present invention to provide a diode detector circuit as described, wherein the diodes are substantially identical and identically biased so that variations in capacitance and capacitive reactance introduced in the circuit under varying load conditions by one diode are cancelled by the other diode.

These and other objects and many of the attendant advantages of this invention will be readily appreciated as the same becomes better understood by reference to the following detailed description when considered in connection with the accompanying drawing in which the sole FIGURE is a diagram of a radio frequency peak power measurement system employing a diode detector circuit according to the invention.

In the drawing, there is shown, an R. F. power measurement system in which R. F. signals from a source 10 are picked up by a probe (not shown) and coupled at a pair of input terminals 11 to a conventionally shielded transmission line 20 comprised of a conductor 16 and a grounded conductor 18. A portion 17 of the conductor 16 has a length of one quarter wavelength of the radio frequency power to be measured. With a line of such a length the effect of any reactance applied at one end appears inverted at the other. Connected to opposite ends of the portion of the line 17 are a pair of cathodes 22,24 of two semi-conductor crystal diodes $D_1$, $D_2$ respectively which have respective anodes 26, 28 connected together at a positive terminal 43 of a variable DC voltage source 44 to apply a bias to the diodes and thereby maintain them at cutoff. The diodes are coupled to the variable voltage source 44 via a conventional radio-frequency bypass or capacitor 40. A radio frequency resistor 32 is connected across the output end of the transmission line 20 to constitute a matched load. The variable voltage power supply 44 may be connected to a peak power meter 42 in a conventional slideback arrangement known in the art (for example, Pat. application 65,159 filed Aug. 19, 1970 now U.S. Pat. No. 3,701,011 issued on Oct. 24, 1972) whereby the voltage applied to the power meter 42 is equal to the voltage across the resistor 32.

In operation of the system, RF energy pulsed or C. W. is supplied by the source 10 and applied at input terminals 11. This input voltage has a peak value $V_1$ which is a function of the input power. The semiconductor diode rectifiers $D_1$ and $D_2$ are substantially identical and are held at cutoff by the voltage $V_2$ supplied by the DC variable voltage source 44. The diodes conduct when voltage $V_1$ exceed voltage $V_2$. At cutoff the diodes $D_1$ and $D_2$ constitute small capacitances in parallel with the transmission line portion 17 across which the diodes are connected. The transmission line has a matching load resistor $R_o$. The diodes are separated by approximately one-quarter wavelength. The mismatching reactance effect introduced in the circuit by diode $D_1$ or $D_2$ is cancelled by the reactance effect introduced by the other diode $D_2$ or $D_1$ respectively, due to the quarter wavelength spacing of the diodes. Since the diodes are essentially lossless when in cutoff and since the quarter wavelength line 17 is also lossless, the peak voltage $V_1'$ appearing a across resistance $R_o$ is identical to peak voltage $V_1$ at the input of the circuit. The voltage $V_1'$, equal to voltage $V_1$, is applied to the peak power meter 42 for measurement.

The measurement of the meter 42 may be relied upon insofar as it is certain that the voltage applied to the meter is identical to that supplied by the voltage source 10. The circuit has compensated for the changes in reactance due to heating and capacitive effects in one diode by the presence of the other diode and the quarter wavelength transmission line. Although the circuit appears to be relatively simple, it is surprisingly effective. By use of inexpensive components at small cost, great accuracy and reliability in readings are attained by use of the dual diode detector circuit which may be embodied in a small probe. It should be understood that the shielded transmission line 20 may be a conventional strip line or a miscrostrip transmission line or a wave guide.

The foregoing relates to only a preferred embodiment of the invention and it is intended to cover all changes and modifications of the example of the invention herein chosen for the purposes of the disclosure, which do not constitute departures from the spirit and scope of the invention.

The invention claimed is:

1. A diode detector circuit for a radio frequency peak pulse power measurement system which is connected to a source of radio frequency power to be measured comprising a transmission line having a pair of conductors one end of said conductors being an input end and the other end of said conductors being an output end, said input end of said conductors being connected to said source for application of said radio frequency power to said line, said line having a length equal to at least one quarter wavelength of said radio-frequency power to be measured, one of said conductors being connected to a ground potential, a first diode rectifier having an anode and a cathode, said anode being connected to the other of said conductors at said input end, a second diode rectifier having an anode and a cathode, said anode being connected to the other of said conductors at said output end, the spacing between said anodes of said first and second diodes being one-quarter wavelength of said radio frequency power to be measured, means for coupling together said cathodes from said first and second diode rectifiers and for biasing said first and second diodes to cutoff when said peak power is applied to said line;

a resistance load connected across said line at said output, said load being matched to said line, said first and said second diode having substantially the same physical parameters so that the peak voltage value of said radio frequency voltage appearing across said resistance load is substantially equal to the peak voltage value of said radio frequency power applied to said input of said line.

2. A diode detector circuit as defined in claim 1, wherein said means for biasing said first and second diodes to cutoff comprises a source of variable DC voltage connected to the cathodes of said first and second diode rectifiers.

3. A diode dectector as recited in claim 2 further comprising a radio-frequency capacitor connected between said diodes and said source of variable DC voltage.

4. A diode detector as defined in claim 2 wherein said variable DC voltage source comprises a slideback voltage circuit.

5. A diode detector circuit as defined in claim 4 further comprising a peak power meter connected to said variable DC voltage source for measuring said peak value of radio frequency voltage applied to said input of said line.

6. A diode detector circuit as defined in claim 5 further comprising a capacitor connected between said diodes and said source of variable DC voltage.

* * * * *